United States Patent
Mazur et al.

(10) Patent No.: US 11,233,387 B2
(45) Date of Patent: Jan. 25, 2022

(54) POWER SYSTEM PERFORMANCE BASED ON UPDATED PERFORMANCE CHARACTERISTICS OF A PROTECTION DEVICE

(71) Applicant: Rockwell Automation Technologies, Inc., Mayfield Heights, OH (US)

(72) Inventors: David C. Mazur, Mequon, WI (US); Troy M. Bellows, Racine, WI (US); Rob A. Entzminger, Lenexa, KS (US); Kurt R. Mickler, Waukesha, WI (US); Bruce K. Venne, Oak Creek, WI (US); John A. Kay, Kitchener (CA); Scott D. Day, Richfield, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 233 days.

(21) Appl. No.: 16/271,278

(22) Filed: Feb. 8, 2019

(65) Prior Publication Data
US 2020/0259323 A1   Aug. 13, 2020

(51) Int. Cl.
*G06F 1/30* (2006.01)
*H02H 3/42* (2006.01)
*H02H 1/00* (2006.01)

(52) U.S. Cl.
CPC .............. *H02H 3/42* (2013.01); *G06F 1/30* (2013.01); *H02H 1/0007* (2013.01)

(58) Field of Classification Search
CPC ........... H02H 3/42; H02H 1/0007; G06F 1/30
See application file for complete search history.

(56) References Cited

U.S. PATENT DOCUMENTS

| | | | | |
|---|---|---|---|---|
| 5,369,356 A | * | 11/1994 | Kinney | H02J 13/0062 324/142 |
| 5,872,722 A | * | 2/1999 | Oravetz | H02H 3/006 700/292 |
| 6,798,630 B1 | * | 9/2004 | Del Vecchio | H02H 3/006 361/97 |
| 6,925,429 B2 | * | 8/2005 | Iimori | G06F 30/367 703/14 |
| 7,096,165 B2 | * | 8/2006 | Pantenburg | G06F 30/00 703/1 |

(Continued)

OTHER PUBLICATIONS

European Search Report for EP20155798 dated Jun. 25, 2020, 7 pages.

*Primary Examiner* — Aurel Prifti

(57) ABSTRACT

Described herein are improvements for a power system by operating the power system using updated performance characteristics for a protection device. In one example, a method includes operating the power system based on a first operational curve for a first protection device of the one or more protection devices. The first operational curve indicates conditions upon which the first protection device will trip. The method also provides obtaining trip information describing conditions that cause the first protection device to trip at each of one or more trip occurrences during operation of the power system. The method further provides adjusting the first operational curve to generate an adjusted first operational curve that reflects the trip information and operating the power system based on the adjusted first operational curve.

20 Claims, 7 Drawing Sheets

(56) References Cited

U.S. PATENT DOCUMENTS

| | | | |
|---|---|---|---|
| 8,270,136 B2* | 9/2012 | Vicente | H02H 7/30 |
| | | | 361/93.2 |
| 10,261,567 B2* | 4/2019 | Mynam | H02H 3/006 |
| 2007/0055889 A1* | 3/2007 | Henneberry | G01R 22/066 |
| | | | 713/186 |
| 2008/0080114 A1* | 4/2008 | Schweitzer | H02H 3/05 |
| | | | 361/62 |
| 2008/0215278 A1* | 9/2008 | Colsch | H01H 69/01 |
| | | | 702/85 |
| 2011/0062939 A1* | 3/2011 | Hoover | H02J 3/14 |
| | | | 323/318 |
| 2013/0070373 A1* | 3/2013 | Jefferies | H02H 6/005 |
| | | | 361/31 |
| 2013/0070378 A1* | 3/2013 | Witte | H01H 83/12 |
| | | | 361/71 |
| 2014/0278179 A1* | 9/2014 | Dougherty | G01R 35/005 |
| | | | 702/85 |
| 2015/0162157 A1* | 6/2015 | Luebke | H02H 3/38 |
| | | | 307/140 |
| 2016/0126719 A1* | 5/2016 | Safari-Shad | H02H 3/16 |
| | | | 361/21 |
| 2016/0172838 A1* | 6/2016 | Luebke | H02H 3/006 |
| | | | 361/93.1 |
| 2016/0225562 A1* | 8/2016 | Franks | H02H 3/08 |
| 2016/0294179 A1* | 10/2016 | Kennedy | H01H 9/54 |
| 2017/0294275 A1* | 10/2017 | Spence | H01H 9/54 |
| 2018/0059186 A1* | 3/2018 | Yang | H02H 1/0092 |
| 2019/0036324 A1* | 1/2019 | Jimenez | H02H 6/005 |
| 2020/0099217 A1* | 3/2020 | Meisinger | H02H 3/06 |

* cited by examiner

POWER SYSTEM PERFORMANCE BASED ON UPDATED PERFORMANCE CHARACTERISTICS OF A PROTECTION DEVICE

TECHNICAL BACKGROUND

Power systems are used to supply electricity in many different types of situations, from electricity for residential outlets to electricity that powers components in a large industrial process. Most power systems include some type of protection device, or devices, that prevents the supply of too much electrical current from a power source of the power system. Typically, the protection device is configured to trip (i.e., cut off the power supply) before the power source exceeds a maximum rated current, voltage, harmonic levels, or power system disturbance of any component in the power system that is downstream from the protection device. For example, in a common residential application, a circuit breaker may be the protection device configured to trip before the current supplied to a circuit exceeds the 15-amp rating of the outlets on the circuit.

Over time the performance characteristics of a protection device may change from the performance initially indicated by the protection device's manufacturer. While those performance changes may go unnoticed if the protection device is part of a power system supplying electricity for, e.g., an industrial process, then the protection device's characteristics may play a large role in determining how the industrial process operates. For example, the performance characteristics of the protection device for a circuit may be used as a basis for configuring loads placed on that circuit (e.g., how many loads, what type of load, how much power each load can draw, etc.). If those performance characteristics change, then the load configuration for the circuit may no longer be ideal, which may cause the industrial process to operate less effectively.

OVERVIEW

Described herein are improvements for a power system by operating the power system using updated performance characteristics for a protection device. In one example, a method includes operating the power system based on a first operational curve for a first protection device of the one or more protection devices. The first operational curve indicates conditions upon which the first protection device will trip. The method also provides obtaining trip information describing conditions that cause the first protection device to trip at each of one or more trip occurrences during operation of the power system. The method further provides adjusting the first operational curve to generate an adjusted first operational curve that reflects the trip information and operating the power system based on the adjusted first operational curve.

In some embodiments, the method provides presenting the adjusted first operational curve on a plot via a user interface. In those embodiments, the method may also provide presenting the first operational curve on the plot with the adjusted first operational curve.

In some embodiments, the method provides that operating the power system based on the adjusted first operational curve includes adjusting one or more settings of the first protection device to account for the difference between the first operational curve and the adjusted first operational curve.

In some embodiments, the method provides that operating the power system based on the adjusted first operational curve includes adjusting one or more settings of one or more loads on the power system to account for the difference between the first operational curve and the adjusted first operational curve.

In some embodiments, the method includes predicting a subsequent adjustment to the adjusted first operational curve and operating the power system to anticipate the subsequent adjustment. In those embodiments, predicting the subsequent adjustment may include determining a first number of operations, performed by the first protection device, corresponding to creation of the adjusted first operational curve, predicting a second number of operations that will be performed by the first protection device after a subsequent period of time, and predicting the subsequent adjustment based on the first operational curve, the adjusted first operational curve, the first number of operations, and the second number of operations. In those examples, predicting the subsequent adjustment may be further based on a second operational curve of a second protection device that performed a third number of operations similar to the second number of operations.

In some embodiments, obtaining the trip information includes receiving the trip information transferred from the first protection device in response to each of the one or more trip occurrences.

In some embodiments, the first protection device includes a circuit breaker or a protective relay.

In other embodiment, an apparatus is provided having one or more computer readable storage media and a processing system operatively coupled with the one or more computer readable storage media. Program instructions stored on the one or more computer readable storage media that, when read and executed by the processing system, direct the processing system to direct a power system to operate based on a first operational curve for a first protection device of the one or more protection devices. The first operational curve indicates conditions upon which the first protection device will trip. The program instructions direct the processing system to obtain trip information describing conditions that cause the first protection device to trip at each of one or more trip occurrences during operation of the power system. The program instructions further direct the processing system to adjust the first operational curve to generate an adjusted first operational curve that reflects the trip information and direct the power system to operate based on the adjusted first operational curve.

DETAILED DESCRIPTION

The protection management systems described herein determine the actual performance characteristics of one or more protection devices in a power system so that those actual performance characteristics can be used as a basis for operating the power system. The actual performance characteristics are beneficial because, even if the performance characteristics provided for a protection device from the protection device's manufacturer are initially correct, those performance characteristics may change over time (e.g., may trip at higher currents than originally specified). The effectiveness of the power system's operation may be better if based upon the actual performance characteristics rather than those provided by a manufacturer. The protection management systems may continue to determine the actual performance characteristics of the protection device over time since those characteristics may continue to change. Operating the power system based on current, rather than out of date, performance characteristics also benefits the effectiveness of the power system.

Figure 1:
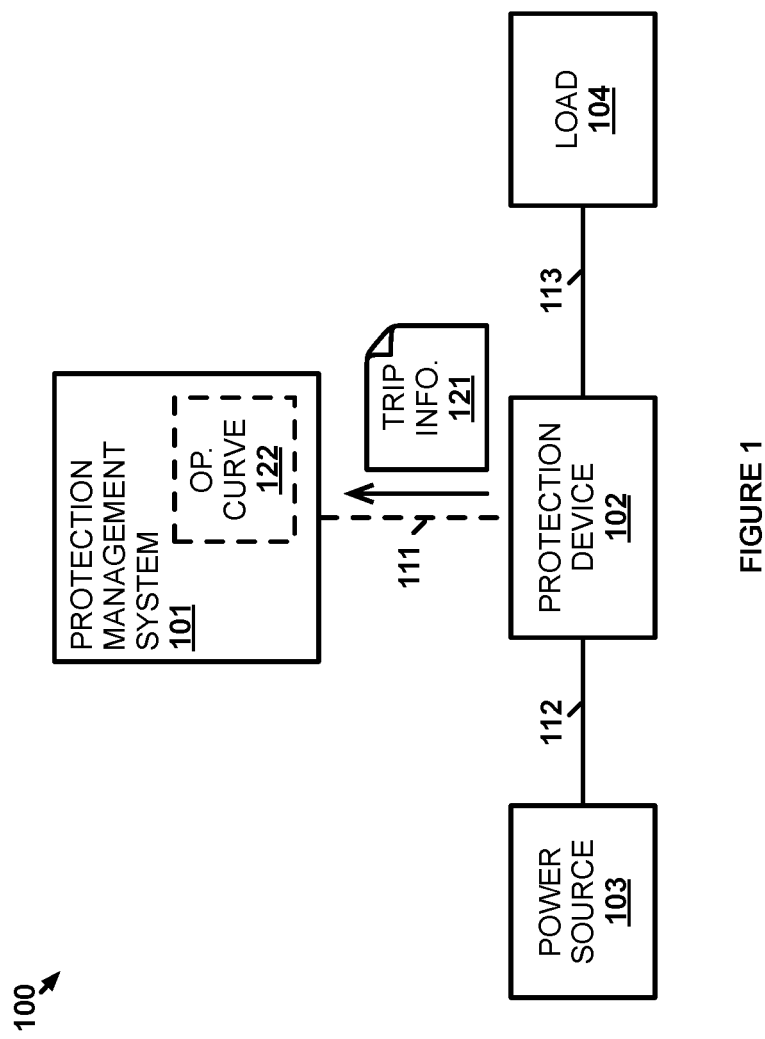
FIG. 1 illustrates an example implementation for improving performance of a power system based on updated performance characteristics of a protection device.

FIG. 1 illustrates implementation 100 for improving performance of a power system based on updated performance characteristics of a protection device. Implementation 100 includes protection management system 101, protection device 102, power source 103, and load 104. Protection management system 101 and protection device 102 communicate over communication link 111. Power source 103 provides electricity through protection device 102 to load 104 via electrical link 112 and electrical link 113.

In operation, protection device 102, power source 103, and load 104 are part of a power system. Power source 103 may be a connection to the electrical grid, an electricity generator, a battery, or some other source of electricity—including combinations thereof. Protection device 102 may be a circuit breaker, protective relay, motor overload device, or some other type of electrical protection device. If the electricity being supplied from power source 103 satisfies the performance characteristics of protection device 102, which indicate when protection device 102 should trip, then protection device 102 will trip to cut off the electricity from being supplied to load 104. Ideally, protection device 102 will trip prior to any damage being done to load 104 or electrical link 113 by the electricity.

Protection management system 101 determines the performance characteristics of protection device 102 to operate the power system based on those performance characteristics. The performance characteristics indicate conditions that would cause protection device 102 to trip (i.e., cut off the electrical circuit to load 104 from power source 103). The conditions in this example indicate an amount of time that electricity passing through protection device 102 can be at respective current amounts before protection device 102 trips. At one current value (typically a relatively high value), protection device 102 may trip in a very short amount of time (i.e., substantially immediately) to prevent damage to load 104 and/or electrical link 113. At another, lower, current value that is less likely to harm load 104 and/or electrical link 113, protection device 102 may not trip for a second or two to give the current a chance to go down before protection device 102 trips. Since the number of possible current amounts for protection device 102 could be infinite, the performance characteristics can be represented as a curve on a plot of current versus time. Operational curve 122 in this example represents the performance characteristics of protection device 102 as stored by protection management system 101. It should be understood that operational curve 122 is meant to describe how the performance characteristics of protection device 102 may be visualized but operational curve 122 may be represented in protection management system 101 as a mathematical equation that describes operational curve 122, as a series of enough discrete plot points to represent operational curve 122, similar to how digital samples are used to represent an analog waveform in computer systems, or in some other computer comprehendible manner. Protection management system 101 updates operational curve 122, as described below, to ensure that protection management system 101 manages the operation of the power system based on as recent as possible actual performance characteristics of protection device 102.

Figure 2:
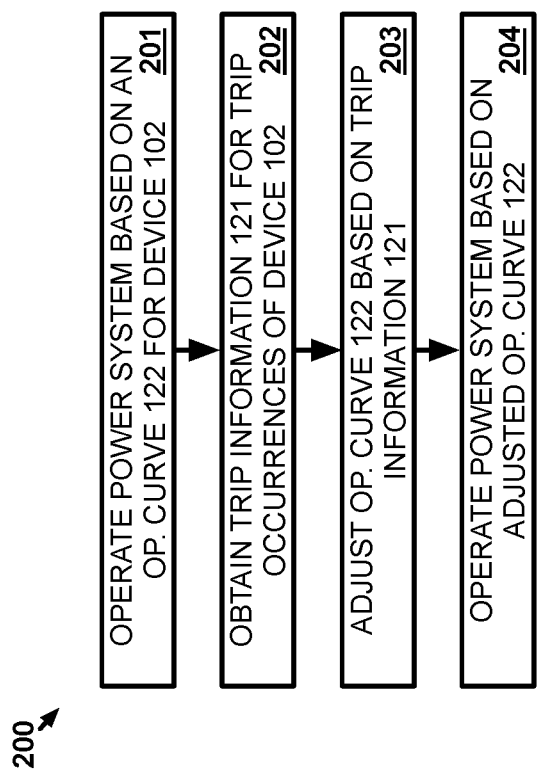
FIG. 2 illustrates an operational scenario for improving performance of a power system based on updated performance characteristics of a protection device.

FIG. 2 illustrates operational scenario 200 for improving performance of a power system based on updated performance characteristics of a protection device. In operational scenario 200, protection management system 101 operates the power system based on a current version of operational curve 122 (201). Operation of the power system by protection management system 101 may include protection management system 101 adjusting parameters of protection device 102 (e.g., adjusting parameters that may change operational curve 122), adjusting the operation of load 104 to effect load 104's power draw via a communication link with load 104 (not shown), adjusting the output of power source 103, notifying a human operator of the power system to make adjustments to power source 103, protection device 102, and/or load 104, or perform some other function that may affect the electrical current through protection device 102.

During operation of the power system, protection management system 101 obtains trip information 121 describing conditions that cause the protection device 102 to trip at each of one or more trip events during operation of the power system (202). Communication link 111 may include a field bus communications link, a packet network link, or some other wired or wireless communication link—including combinations thereof—over which trip information 121 is received. In some configurations, communication link 111 may transmit Real-time Data (RTD) that carries the trip information 121. In some examples, protection device 102 may not include communication circuitry necessary for communication with protection management system 101 and may require trip information 121 to be manually retrieved and provided to protection management system 101 by a human operator. In further examples, a monitor device may be included in series with protection device 102 to measure current throughput at protection device 102, record when protection device 102 trips, and provide trip information 121 over communication link 111. In yet further examples, at least a portion of trip information 121 will be received from other types of measurement systems/devices, such as a power monitoring device, an arc sensing system, an incident energy analyzer, a device for measuring impedance of the power system, a thermal monitoring device, or some other system/device that can measure information relevant to determining conditions that caused a protection device to trip. Trip information 121 may include trip information for a single trip instance (e.g., sent after each trip instance), may include trip information for multiple trips over a period of time, or protection device 102 may transfer trip information 121 on some other schedule. The trip information for each trip of trip information 121 includes at least a last known electrical current amount through protection device 102 before protection device 102 tripped and an amount of time that the current remained at that amount before protection device 102 tripped. Essentially, the trip information corresponds to a point on a similar plot to that in which operational curve 122 is represented.

Protection management system 101 then adjusts operational curve 122 to generate an adjusted version of operational curve 122 that reflects trip information 121 (203). The adjustment to operational curve 122 is performed so that the performance characteristics of protection device 102, as known to protection management system 101, reflect the actual performance characteristics. If any of the trip conditions represented in trip information 121 do not fall on operational curve 122, then those trip conditions indicate that the performance characteristics represented by operational curve 122 no longer correspond to the actual performance characteristics of protection device 102. Thus, protection management system 101 adjusts operational curve 122 to represent the performance characteristics that protection management system 101 determined from the actual performance of protection device 102 via trip information 121.

To adjust operational curve 122, protection management system 101 moves operational curve 122 on its plot so that operational curve 122 passes through points corresponding to the conditions indicated by respective trips in trip information 121. In some examples, adjusting operational curve 122 may comprise creating a completely new curve that includes those points. Depending on how many trips are represented in trip information 121, and the diversity of the conditions that caused each trip, protection management system 101 may need to infer a path for operational curve 122 between points. In an extreme example, if trip information 121 only represents a single trip event, then protection management system 101 may simply maintain operational curve 122's previous shape while shifting it to pass through the point corresponding to that trip event. In other examples, protection management system 101 may trace an adjusted version of operational curve 122 through the points represented by each trip event and it should be understood that, while the adjustments above are discussed with respect to a visualization of a curve (i.e., moving the curve, tracing the curve, etc.), protection management system 101 may perform those adjustments by modifying the mathematical equation representing operational curve 122, by creating a new mathematical equation to represent operational curve 122, by modifying the discrete plot points that represent operational curve 122, or by performing some other action that would result in an adjusted version of operational curve 122.

After adjusting operational curve 122, protection management system 101 operates the power system based on the adjusted version of operational curve 122 (204). Like when operating the power system in step 201 above, protection management system 101 may operate the power system by adjusting parameters of protection device 102, adjusting the operation of load 104 to effect load 104's power draw, adjusting the output of power source 103, notifying a human operator of the power system to make adjustments to power source 103, protection device 102, and/or load 104, or perform some other function that may affect the electrical current through protection device 102. Although, in this case, protection management system 101 is performing those operating tasks based on an adjusted version of operational curve 122 rather than the previous version of operational curve 122, which may have been an original manufacturer-provided specification for protection device 102 or may have been the result of a previous adjustment in accordance with operational scenario 200. Since the actual electrical current conditions that cause protection device 102 to trip during the time period from which trip information 121 was collected are now represented by adjusted operational curve 122, protection management system 101 operates the power system based on those actual conditions rather that whatever conditions were previously represented by operational curve 122.

Even after operational curve 122 is updated, operational scenario 200 may repeat to continually update operational curve 122 to reflect the performance characteristics of protection device 102 at subsequent times. As protection device 102 continues to operate, the performance characteristics of protection device 102 will change (usually degrading) over time, which changes the electrical current conditions that cause protection device 102 to trip. Thus, updating operational curve 122 to reflect changes in performance characteristics of protection device 102 is advantageous so that protection management system 101 can operate the power system most effectively (e.g., without causing protection device 102 to trip under conditions that protection management system 101 could have directed the power system to avoid based on an updated version of operational curve 122).

Figure 3:
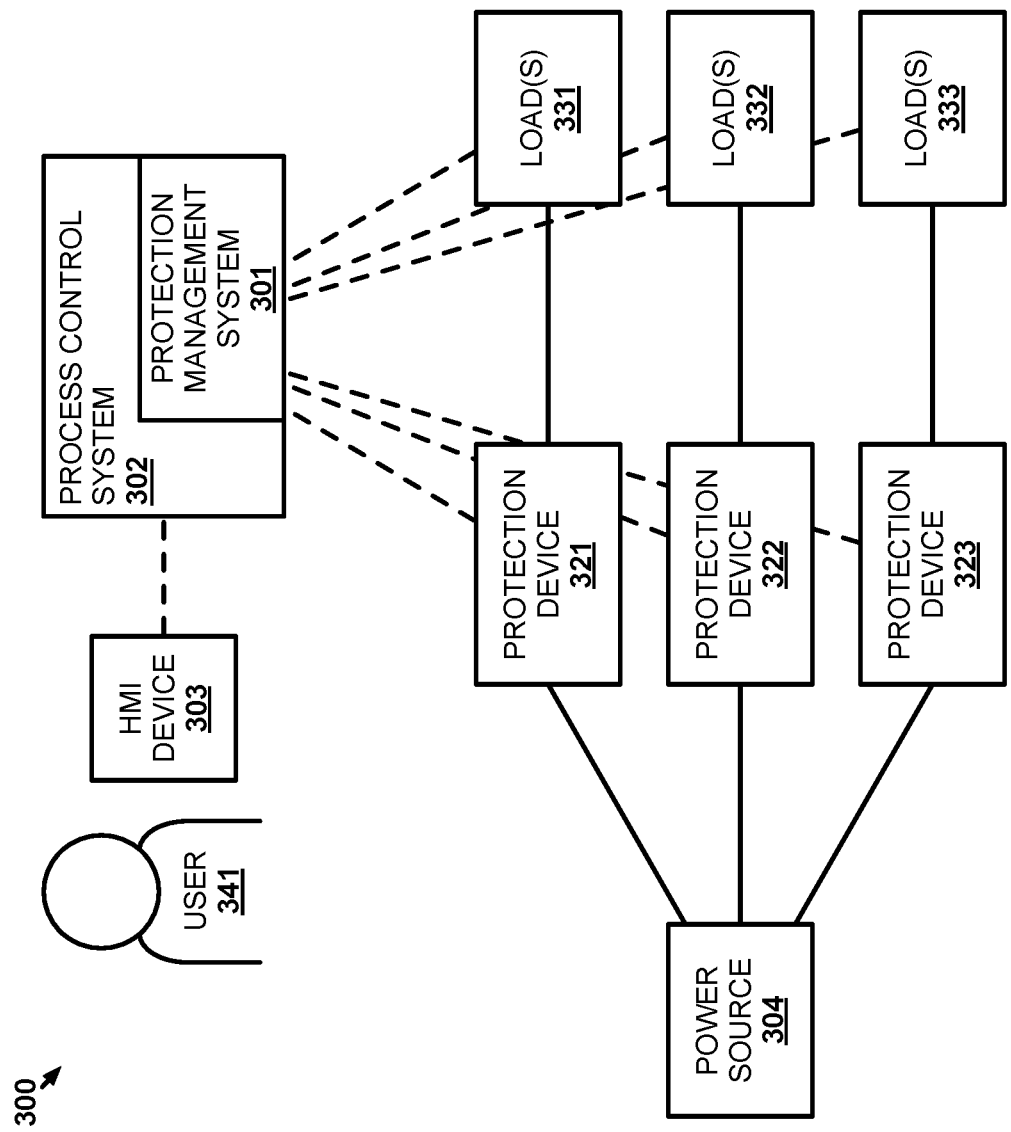
FIG. 3 illustrates another example implementation for improving performance of a power system based on updated performance characteristics of a protection device.

FIG. 3 illustrates implementation 300 for improving performance of a power system based on updated performance characteristics of a protection device. Implementation 300 includes protection management system 301, process control system 302, human machine interface (HMI) device 303, power source 304, protection device 321, protection device 322, protection device 323, load(s) 331, load(s) 332, and load(s) 333. Protection device 321, protection device 322, and protection device 323 each have electrical connections to power source 304 and respective load(s) 331, load(s) 332, and load(s) 333.

In operation, protection device 321 protects load(s) 331, protection device 322 protects load(s) 332, and protection device 323 protects load(s) 333. Protection device 321, protection device 322, and protection device 323 may each comprise a circuit breaker, a protective relay, transformer, or some other type of electrical equipment or control protection device. While protection device 321, protection device 322, and protection device 323 are positioned in parallel, other examples may include protection devices positioned in series. For example, another protection device may be positioned between power source 304 and protection device 321, protection device 322, and protection device 323 to provide additional protection to the power system of implementation 300.

Load(s) 331, load(s) 332, and load(s) 333 each comprise one or more components that draw electricity from power source 304 to perform a task in an industrial process. A load may be a motor, actuator, pump, control system, or any other type of electrically powered element in an industrial process. Process control system 302 is in communication with protection device 321, protection device 322, protection device 323, load(s) 331, load(s) 332, and load(s) 333 to control the industrial process. While shown as a single device, process control system 302 may be distributed across multiple devices. In this example, protection management system 301 is a component of process control system 302 that maintains performance characteristics of protection device 321, protection device 322, and protection device 323. Protection management system 301 may include dedicated hardware within process control system 302 (e.g., processing circuitry, data storage, communication circuitry, etc.) or may be implemented as a software component executing along with other software components on process control system 302 to control the industrial process in the manner described below.

HMI device 303 provides user 341 with an interface for interacting with process control system 302 over a wired and/or wireless communication connection with process control system 302 either directly or over a communication network. HMI device 303 may be a dedicated device for providing an HMI interface to process control system 302 or may be another type of user device, such as a smartphone, personal computer, or tablet computer, on which software directs HMI device 303 to provide an HMI interface. In some examples, process control system 302 may include a user interface for interacting with user 341. In those examples, HMI device 303 may not be used since process control system 302 can provide an HMI interface to user 341 directly.

Figure 4:
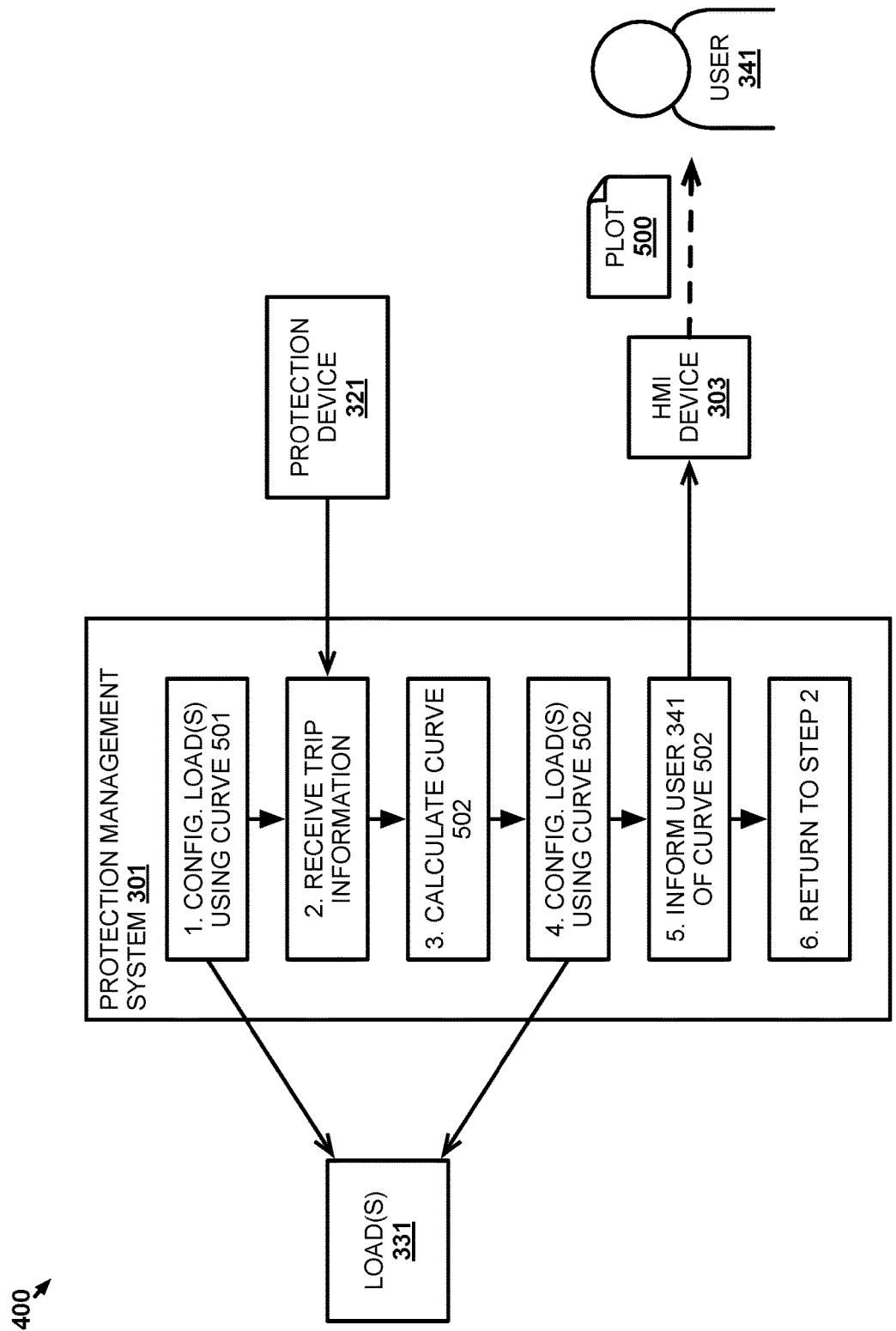
FIG. 4 illustrates an operational scenario for improving performance of a power system based on updated performance characteristics of a protection device.

FIG. 4 illustrates operational scenario 400 for improving performance of a power system based on updated performance characteristics of a protection device. This example discusses the power system of implementation 300 with respect to load/protection device combination of protection device 321 and load(s) 331 but it should be understood that the same process would be used for the other load/protection device combinations. Operational scenario 400 is described below with respect to operational curve 501 and operational curve 502 on operational curve plot 500.

Figure 5:
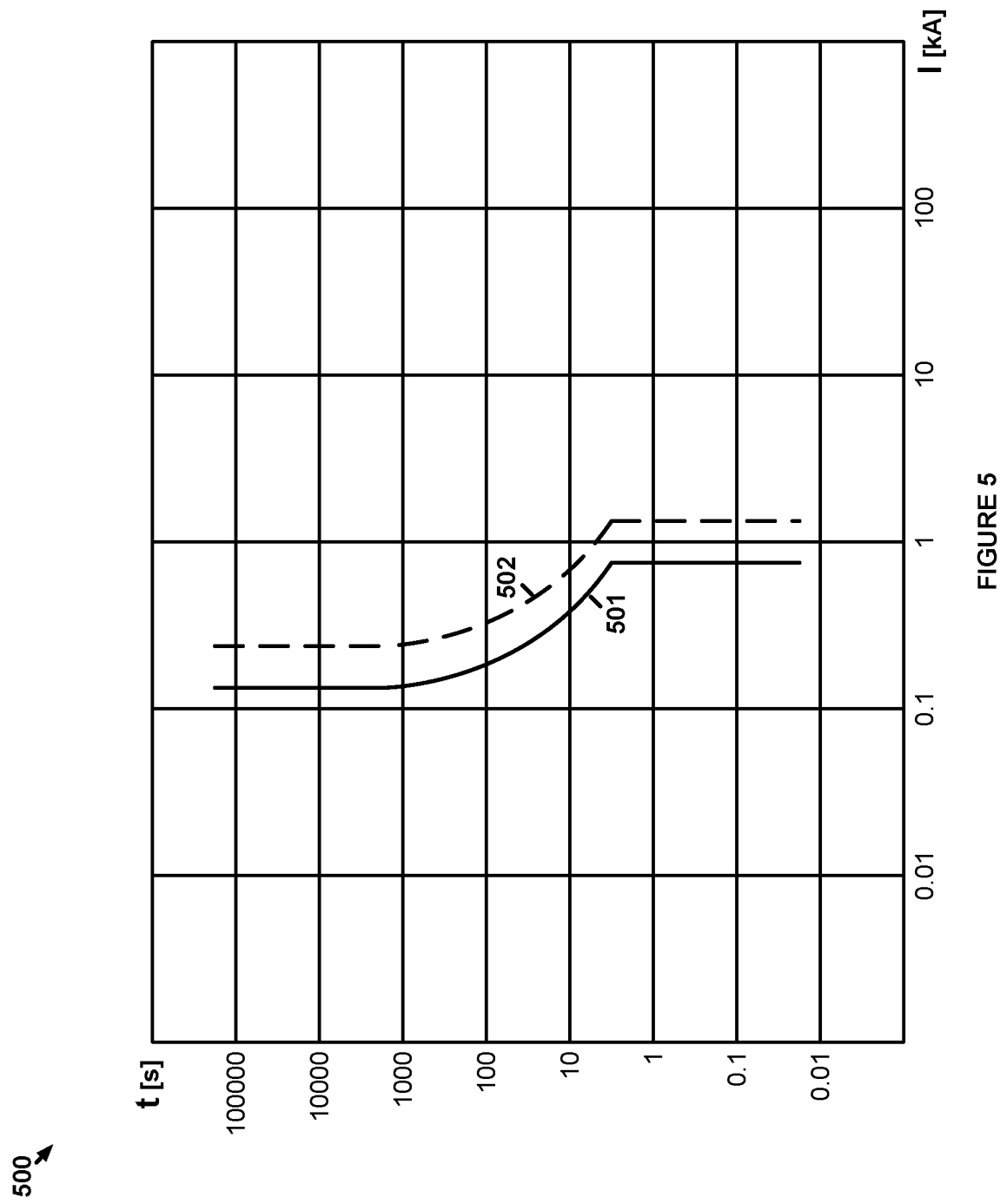
FIG. 5 illustrates an example operational curve plot for improving performance of a power system based on updated performance characteristics of a protection device.

FIG. 5 illustrates operational curve plot 500 for improving performance of a power system based on updated performance characteristics of a protection device. The horizontal axis of operational curve plot 500 represents current in kiloamps and the vertical axis represents time in seconds. Both axes are represented on a logarithmic scale. Operational curve 501 and operational curve 502 are both shown on operational curve plot 500 and reflect performance characteristics of protection device 321 before and after adjustment is made for trip information, as described in more detail below. Assuming an operational curve accurately represents the actual conditions that will cause protection device 321 to trip, as long as the electrical current through protection device 321 remains to the left of the operational curve. Protection management system 301's goal is therefore to operate the power system, of which protection device 321 is a part, such that the electrical current supplied to load(s) 331 under normal operation remains left of the operational curve.

Referring back to operational scenario 400, protection management system 301 configures load(s) 331 at step 1 using on operational curve 501 to indicate how load(s) 331 should be configured. Operational curve 501 may be an initial operational curve provided to protection management system 301 by the manufacturer of protection device 321, may be an operational curve determined from a previous iteration of operational scenario 400, may be an estimated operational curve determined by protection management system 301 or provided by a user, or may be obtained by protection management system 301 in some other manner. Configuring load(s) 331 may comprise protection management system 301 defining parameters under which each of load(s) 331 operate (e.g., a speed in which a drive motor runs), indicating which of load(s) 331 should be active, or performing some other action that may affect the electrical current drawn by load(s) 331—including combinations thereof. In this example, protection management system 301 configures load(s) 331 by communicating with load(s) 331 through the communication links therewith. In other examples, protection management system 301 may present a recommendation or instruction to a user, such as user 341, to manually perform the configuration. In some examples, protection management system 301 may further configure load(s) 332 and/or load(s) 333 in addition to load(s) 331 because the configuration of load(s) 331 may affect other aspects of the industrial process. For instance, if the configuration of load(s) 331 slows down the task performed by load(s) 331, then load(s) 332 and load(s) 333 may also need to slow down their tasks to keep pace. While only loads are discussed with respect to the configuration performed in step 1, other aspects of the power system, such as protection device 321, may be configured as well, or instead, in other examples.

While the industrial process is being performed by load(s) 331, load(s) 332, and load(s) 333, protection management system 301 receives trip information at step 2 from protection device 321. The trip information indicates electrical current conditions that existed for each of one or more times protection device 321 tripped. The electrical conditions for each trip event include an amount of electrical current passing through protection device 321 and how long the electrical current was at that amount before protection device 321 tripped. In some examples, the trip information may simply indicate the current amounts over time for a period of time leading up to a trip event and protection management system 301 determines itself the conditions that caused protection device 321 to trip. Protection device 321 may transfer the trip information upon occurrence of each trip event, may transfer the trip information in batches of more than one trip event, may transfer trip information periodically (e.g., once per day), may transfer the trip information upon protection management system 301 requesting the trip information, or may transfer the trip information on some other schedule. Protection management system 301 may proceed to step 3 upon receiving trip information regardless of how many trip events are represented by the trip information or may wait until trip information representing a threshold number of trip events is received.

Protection management system 301 then uses the trip information at step 3 to calculate operational curve 502 shown in operational curve plot 500. Protection management system 301 calculates operational curve 502 to reflect the conditions that actually caused protection device 321 to trip during the time period in which the trip events included in the trip information occurred. Protection management system 301 determines operational curve 502 as being a curve that passes through points on operational curve plot 500 that represent the conditions during each trip event. In some cases, conditions for a particular trip event may be outside what would produce a proper curve (e.g., may be an offshoot from a curve shape). In those cases, those conditions may be ignored when protection management system 301 calculates operational curve 502. Alternatively, protection management system 301 may perform a best fit algorithm that estimates a best fit for curve 502 that does not pass through one or more points directly but, instead, maintains a desirable curve shape while passing as close as possible to those points.

The trip information in this example may further include additional operational information about conditions that may have indirectly caused protection device 321 to trip. For example, in addition to the amount of current flowing through protection device 321 on and/or around the time a trip occurs, the trip information may further indicate a voltage of the power at protection device 321, an amount of power at protection device 321, a frequency of the electricity at protection device 321, the internal and/or external thermal temperature of protection device 321, or some other type of information related to the operation of protection device 321 on and/or around the time a trip occurs. Using that additional operational information, protection management system 301 may be able to infer that something beyond the amount of current flowing through protection device 321 affected the operation of protection device 321. For instance, protection management system 301 may determine that the operational curve of protection device 321 is different depending on the internal temperature of protection device 321. Different operational curves for protection device 321 may therefore be generated and used by protection management system for different temperature ranges.

Once operational curve 502 has been determined, protection management system 301 configures load(s) 331 at step 4 using operational curve 502 to indicate how load(s) 331 should be configured. Protection management system 301 has the same configuration options available to it as protection management system 301 had at step 1 but protection management system 301 uses operational curve 502 rather than operational curve 501 to determine the configuration for load(s) 331. In some examples, the configuration of load(s) 331 may end up being the same as when operational curve 501 was used as the basis for the configuration. As was the case in step 1, protection management system 301 may also configure load(s) 332, load(s) 333, and/or protection device 321 based on operational curve 502. For example, protection management system 301 may adjust operating parameters of protection device 321 in an attempt to bring operational curve 502 closer to operational curve 501. Protection management system 301 would could then determine whether those operating parameter adjustments worked as intended during a subsequent iteration of operational scenario 400.

Protection management system 301 also informs user 341 at step 5 that operational curve 502 has been calculated to presently be the operational curve for protection device 321. In this example, protection management system 301 informs user 341 by transferring operational curve 502 so that operational curve 502 can be presented to user 341 by HMI device 303. HMI device 303 then displays operational curve plot 500 to inform user 341 of both operational curve 502 and operational curve 501 so that user 341 can visually compare how the operational curve for protection device 321 has changed. In other examples, operational curve 502 may be displayed by itself or with additional curves from previous iterations of operational scenario 400 that allow user 341 to further visualize how the operational curve of protection device 321 changes over time.

It should be understood that step 5 may occur any time after operational curve 502 has been calculated, not just after load(s) 331 have been configured, as shown in operational scenario 400. In one example, user 341 may be further notified of the configurations that protection management system 301 intends to perform based on process control system 302 and require user 341 to confirm, via HMI device 303, that the configurations should be made. After confirmation protection management system 301 then performs step 4. User 341 may also provide input as to some or all of the configurations that will be performed by protection management system 301. In some examples, HMI device 303 may further be used by protection management system 301 to direct user 341 to perform configuration tasks that protection management system 301 is not able to perform by itself. For instance, operational curve 502 may indicate to protection management system 301 that protection device 321 has gone bad and needs to be replaced. In some configurations of implementation 300 may allow protection management system 301 to automatically switch to a new protection device from protection device 321 (e.g., a backup protection device may be installed and protection management system 301 may control a switch to change between the two). However, in other configurations of implementation 300, protection management system 301 may need assistance from user 341 to replace protection device 321 and may then direct user 341 to do so through a user notification from HMI device 303.

Operational scenario 400 then repeats at step 6 with protection management system 301 returning to step 2 to receive additional trip information from protection device 321, or protection device 321's replacement if replacement was performed (if a replacement was performed operational curve 502 would likely not be used since operational curve 502 was calculated from protection device 321). By repeating, protection management system 301 is able to continually update the operational curve of protection device 321 so that protection management system 301 can configure the various elements of the power system in implementation 300 based on the updated operation curve, as discussed above. In some examples, protection management system 301 may wait a period of time (e.g., an amount of clock time or a number of operations, including manual operations in addition to trip events, for protection device 321) before repeating since it is unlikely that the operational curve will change an appreciable amount right after operational curve 502 is calculated. In some examples, protection management system 301 may monitor trip information to determine when the trip conditions of protection device 321 have deviated at least a threshold amount from operational curve 502 to warrant calculating a new curve.

Figure 6:
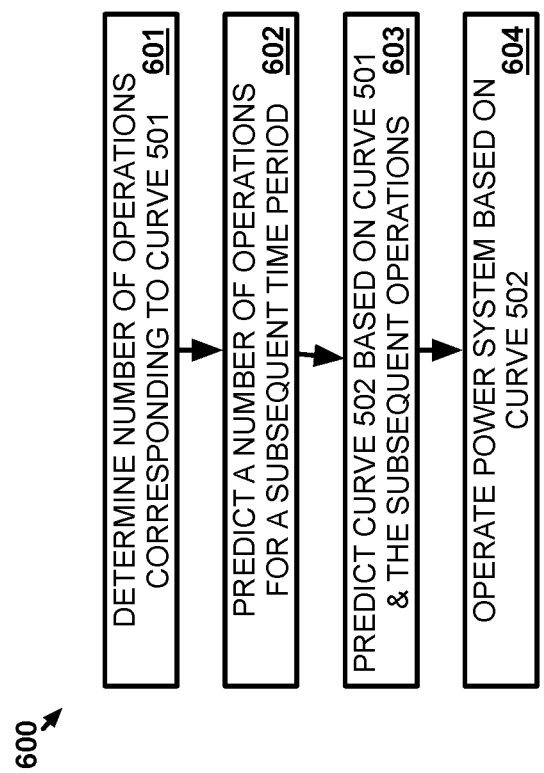
FIG. 6 illustrates an operational scenario for improving performance of a power system based on updated performance characteristics of a protection device.

FIG. 6 illustrates operational scenario 600 for improving performance of a power system based on updated performance characteristics of a protection device. Operational scenario 600 is again described with respect to protection device 321 but it should be understood that protection management system 301 may perform similarly with respect to protection device 322 and protection device 323 as well. As protection device 321 performs operations, including manual and automatic openings and closings of protection device 321, the performance characteristics of protection device 321 will change. While the above examples determined an operational curve for protection device 321 after the characteristics changed by receiving trip information, this example predicts what the operational curve for protection device 321 will be in the future. Operational scenario 600 will be described with respect to operational curve 501 and operational curve 502 from operational curve plot 500 but, in this case, operational curve 502 will be a predicted operational curve rather than one calculated from trip information, as was the case in operational scenario 400.

In operational scenario 600, protection management system 301 determines a number of operations performed by protection device 321 that correspond to operational curve 501 (601). Protection device 321 may track the number of operations it has performed since new (or since installed) and inform protection management system 301 of that number, either automatically or upon request. Alternatively, protection device 321 may notify protection management system 301 of each operation and protection management system 301 may itself keep track of the number of operations. Preferably the number of operations corresponds to the last operation included in the trip information used to calculate operational curve 501, although, the number may correspond to another operation in the trip information. In some examples, protection management system 301 may consider the operation numbers for every trip event in the trip information used to calculate protection management system 301 to get a more complete picture of the number of operations that correspond to the creation of operational curve 501. In some cases, the number of operations performed by protection device 321 that correspond to operational curve 501 may simply need to serve as a baseline and can therefore be set to any suitable number, such as 0.

Protection management system 301 also predicts a number of operations for a time period subsequent to operational curve 501 being calculated (602). The prediction may be based on historical operation numbers information for protection device 321, historical operation numbers information for previous protection devices connected to load(s) 331, historical operation numbers information for other protection devices similar to protection device 321, or some other information relevant to the number of times protection device 321 may be operated in the future. The subsequent number of operations indicates how many additional operations are predicted to be performed by protection device 321 since operational curve 501. As noted above, since operations change the performance characteristics of protection device 321, predicting the number of operations that will be performed is beneficial to determining how much those performance characteristics will change by the end of the subsequent time period.

From the predicted number of subsequent operations, protection management system 301 predicts operational curve 502 (603). In some cases, manufacturer provided data, historical change data for other protection devices, or some other data that indicates how operations effect performance characteristic change, may be used to determine how the number of subsequent operations effects the operational curve of protection device 321. For example, the manufacturer of protection device 321 may provide an indication of how performance characteristics for devices like protection device 321 should change, based on the number of operations performed. In those examples, if protection management system 301 knows the number of operations corresponding to operational curve 501, protection management system 301 can reference that manufacturer provided information to determine how the performance characteristics will change from operational curve 501 to operational curve 502 based on the number of operations predicted to occur there between. In another example, operational curves for a similar prediction device to protection device 321 (e.g., same model) may have been determined in a process similar to that of operational scenario 400. If the total number of operations for protection device 321 (i.e., the number of operations corresponding to operational curve 501 plus the predicted number of operations) is similar to the total number of operations associated with an operational curve of the similar device, then that operational curve may be used as a basis for predicting operational curve 502. In yet another example, operational curves prior to operational curve 501 may also be considered so that protection management system 301 can predict operational curve 502 based on a trend identified from multiple previous operational curves for protection device 321.

Once operational curve 502 has been determined, protection management system 301 operates the power system of implementation 300 based on operational curve 502 (604). Since operational curve 502 is a predicted curve, protection management system 301 may begin by operating the power system based on operational curve 501. Then, as time passes and protection device 321 performs operations, protection management system 301 will begin operating the power system based on operational curve 502 in anticipation of operational curve 502 representing the performance characteristics of protection device 321. Even though operational curve 502 was predicted by protection management system 301, protection management system 301 may still perform operational scenario 400 to determine an actual operational curve for protection device 321. In such examples, once the subsequent time period elapses, protection management system 301 can effectively determine how close predicted operational curve 502 was to the actual operational curve and begin operating the power system based on that actual operational curve. The actual operational curve may likewise be used to help predict future operational curves for other protection devices, like was done in operational scenario 600.

Figure 7:
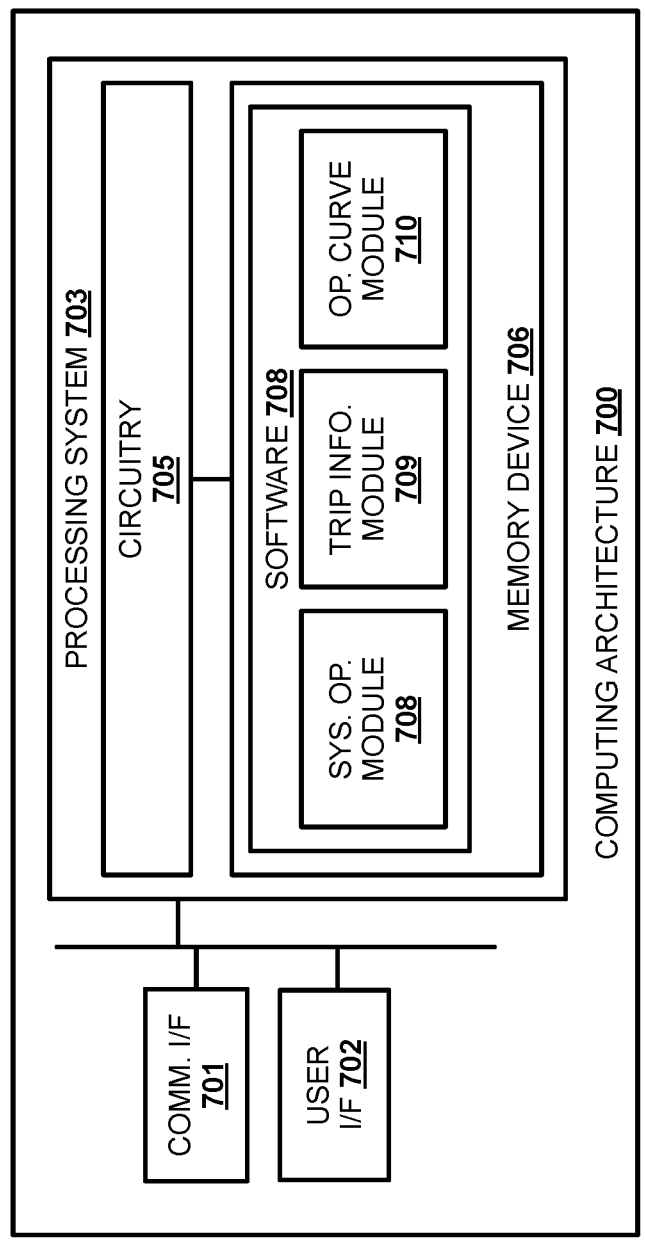
FIG. 7 illustrates an example computing architecture for improving performance of a power system based on updated performance characteristics of a protection device.

FIG. 7 illustrates computing architecture 700 for improving performance of a power system based on updated performance characteristics of a protection device. Computing architecture 700 is an example computing architecture for protection management system 101, although alternative configurations may also be used. Computing architecture 700 may similarly be an example architecture for other elements described above, such as process control system 302 and HMI device 303, although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises processing circuitry, such as a microprocessor, and other circuitry that retrieves and executes operating software 707 from memory device 706. Memory device 706 comprises one or more computer readable storage media, such as a disk drive, flash drive, data storage circuitry, or some other memory apparatus that in no cases should be considered a mere propagated signal. Operating software 707 comprises computer programs, firmware, or some other form of machine-readable processing instructions. Operating software 707 includes system operation module 708, trip information module 709, and operational curve module 710. Operating software 707 may further include an operating system, utilities, drivers, network interfaces, applications, or some other type of software. When executed by circuitry 705, operating software 707 directs processing system 703 to operate computing architecture 700 as described herein.

In particular, system operating module 708 directs processing system 703 to operate the power system based on a first operational curve for a first protection device of the one or more protection devices. The first operational curve indicates conditions upon which the first protection device will trip. For a first protection device of the one or more protection devices, trip information module 709 directs processing system 703 to obtain trip information describing conditions that cause the first protection device to trip at each of one or more trip occurrences during operation of the power system. Operational curve module 710 directs processing system 703 to adjust a first operational curve for the first protection device to generate an adjusted first operational curve that reflects the trip information. System operation module 708 directs operational curve module 710 to operate the power system based on the adjusted first operational curve.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for improving performance of a power system that includes one or more protection devices, the method comprising:
    operating the power system based on a first operational curve for a first protection device of the one or more protection devices, wherein the first operational curve indicates conditions upon which the first protection device will trip;
    actual conditions that have caused the first protection device to trip at each of one or more trip occurrences during operation of the power system, wherein each actual condition indicates an amount of electrical current passing through the first protection device and a period of time the amount of electrical current maintains before the first protection device tripped;
    generating an adjusted first operational curve that passes through points corresponding to the actual conditions;
    operating the power system based on the adjusted first operational curve; and
    determining a first number of operations comprising a first number of openings and closings performed by the first protection device, corresponding to creation of the adjusted first operational curve.

2. The method of claim 1, further comprising:
    presenting the adjusted first operational curve on a plot via a user interface.

3. The method of claim 2, further comprising:
    presenting the first operational curve on the plot with the adjusted first operational curve.

4. The method of claim 1, wherein operating the power system based on the adjusted first operational curve comprises:
    adjusting one or more settings of the first protection device to account for a difference between the first operational curve and the adjusted first operational curve.

5. The method of claim 1, wherein operating the power system based on the adjusted first operational curve comprises:
    adjusting one or more settings of one or more loads on the power system to account for a difference between the first operational curve and the adjusted first operational curve.

6. The method of claim 1, further comprising:
    predicting a subsequent adjustment to the adjusted first operational curve; and
    operating the power system to anticipate the subsequent adjustment.

7. The method of claim 6, wherein predicting the subsequent adjustment comprises:
    determining a first number of operations, performed by the first protective device, corresponding to creation of the adjusted first operation curve;
    predicting a second number of operations comprising a second number of openings and closings that will be performed by the first protection device after a subsequent period of time; and
    predicting the subsequent adjustment based on the first operational curve, the adjusted first operational curve, the first number of operations, and the second number of operations.

8. The method of claim 7, wherein predicting the subsequent adjustment is further based on a second operational curve of a second protection device that performed a third number of operations similar to the second number of operations.

9. The method of claim 1, wherein obtaining the actual conditions comprises:
    receiving the actual conditions transferred from the first protection device in response to each of the one or more trip occurrences.

10. The method of claim 1, wherein the first protection device comprises a circuit breaker or a protective relay.

11. An apparatus for improving performance of a power system that includes one or more protection devices, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    direct the power system to operate based on a first operational curve for a first protection device of the one or more protection devices, wherein the first operational curve indicates conditions upon which the first protection device will trip;
    obtain actual conditions that have caused the first protection device to trip at each of one or more trip occurrences during operation of the power system, wherein each actual condition indicates an amount of electrical current passing through the first protection device and a period of time the amount of electrical current maintains before the first protection device tripped;
    generate an adjusted first operational curve that passes through points corresponding to the actual conditions;
    direct the power system to operate based on the adjusted first operational curve; and determine a first number of operations comprising a first number of openings and closings performed by the first protection device, corresponding to creation of the adjusted first operational curve.

12. The apparatus of claim 11, wherein the program instructions, when read and executed by the processing system, further direct the processing system to:
present the adjusted first operational curve on a plot via a user interface.

13. The apparatus of claim 12, wherein the program instructions, when read and executed by the processing system, further direct the processing system to:
present the first operational curve on the plot with the adjusted first operational curve.

14. The apparatus of claim 11, wherein operating the power system based on the adjusted first operational curve comprises:
adjusting one or more settings of the first protection device to account for a difference between the first operational curve and the adjusted first operational curve.

15. The apparatus of claim 11, wherein operating the power system based on the adjusted first operational curve comprises:
adjusting one or more settings of one or more loads on the power system to account for a difference between the first operational curve and the adjusted first operational curve.

16. The apparatus of claim 11, wherein the program instructions, when read and executed by the processing system, further direct the processing system to:
predict a subsequent adjustment to the adjusted first operational curve; and
operate the power system to anticipate the subsequent adjustment.

17. The apparatus of claim 16, wherein predicting the subsequent adjustment comprises:
predicting a second number of operations comprising a second number of openings and closings that will be performed by the first protection device after a subsequent period of time; and
predicting the subsequent adjustment based on the first operational curve, the adjusted first operational curve, the first number of operations, and the second number of operations.

18. The apparatus of claim 17, wherein predicting the subsequent adjustment is further based on a second operational curve of a second protection device that performed a third number of operations similar to the second number of operations.

19. The apparatus of claim 11, wherein obtaining the actual conditions comprises:
receiving the actual conditions transferred from the first protection device in response to each of the one or more trip occurrences.

20. One or more computer readable storage media having program instructions stored thereon for improving performance of a power system that includes one or more protection devices, the program instructions, when executed by a processing system, direct the first endpoint system to:
direct the power system to operate based on a first operational curve for a first protection device of the one or more protection devices, wherein the first operational curve indicates conditions upon which the first protection device will trip;
obtain actual conditions that have caused the first protection device to trip at each of one or more trip occurrences during operation of the power system, wherein each actual condition indicates an amount of electrical current passing through the first protection device and a period of time the amount of electrical current maintains before the first protection device tripped;
generate an adjusted first operational curve that passes through points corresponding to the actual conditions;
direct the power system to operate based on the adjusted first operational curve; and
determine a first number of operations comprising a first number of openings and closings performed by the first protection device, corresponding to creation of the adjusted first operational curve.

* * * * *